324-77 CROSS REFERENCE SEARCH ROO

April 9, 1968 W. C. DERSCH 3,377,428

VOICED SOUND DETECTOR CIRCUITS AND SYSTEMS

Filed Dec. 29, 1960 2 Sheets-Sheet 1

*INVENTOR.*
WILLIAM C. DERSCH

BY FRASER AND BOGUCKI

ATTORNEYS 3,377,428
Patented Apr. 9, 1968

3,377,428

VOICED SOUND DETECTOR CIRCUITS AND SYSTEMS

William C. Dersch, Los Gatos, Calif., assignor to International Business Machines Corporation, New York, N.Y., a corporation of New York Filed Dec. 29, 1960, Ser. No. 79,389
13 Claims. (Cl. 179—1)

ABSTRACT OF THE DISCLOSURE

Symmetry of unvoiced sounds and asymmetry of voiced sounds are detected and utilized by splitting the wave, rectifying each portion, and subtracting one from the other. The presence of a difference signal indicates asymmetry or voiced sound.

This invention relates to speech recognition and speech operated systems, and particularly to circuits for the detection and use of voiced sounds in human speech.

The utility of speech recognition and utilization equipment to many different types of communications and automatic data processing systems will clearly be evident to those concerned with the preparation, transmittal and use of coded data. In effect, with automatic speech recognition equipment a communications or data processing system may be made to respond to spoken commands, thus eliminating extensive input equipment otherwise needed for translating the commands of an operator into stored patterns or transitory signals. Similarly, for commercial and business purposes spoken intelligence may be transcribed directly and automatically into a written form.

One approach to the problem of automatic speech recognition and utilization has been to make a broad segregation of uttered sounds according to their quality. The "voiced" sounds are defined in this art as those sounds which originate with puffs of air passing through the vocal chamber and which are modulated by physical changes in the various resonant chambers in the throat and mouth of the speaker. These sounds are distinguished from the "unvoiced" sounds, which are formed primarily by air passing through constrictive chambers in the throat, mouth or at the teeth or lips. The voiced sounds are like complex multifrequency waves, but are not truly periodic and have damped oscillatory characteristics. The voiced sounds do, however, have, for fundamental as well as harmonic frequency components, relatively brief but discernible intervals, and these components can usually be identified. The unvoiced sounds do not contain such fundamental frequencies, which are usually of the order of a few hundred to a few thousand cycles per second, but are noiselike in character and consist of essentially random amplitude vibrations with time.

The problems involved in human speech recognition are extremely complex. The human mind has the capacity for and capability of recognizing meaningful sounds despite variations in frequency, amplitude and speech rate. The human mind can also distinguish more subtle variations, such as those resulting from different intonations, inflections and emotional factors. Further the mind can perform these functions in the present of ambient noise. Speech recognition systems which compensate for even a few of these factors have been extremely complex, and have usually involved some sort of "normalization" so as to correct for the major variables of frequency, amplitude and speech rate. One technique which has been used is to analyze electrical signal representations of spoken words in the time domain, by sampling for certain selected characteristics of the spoken word at various times. Another technique employs analysis in the frequency domain, and checks for the existence of combinations of various frequencies and harmonics of those frequencies. A further extension of both of these techniques utilizes energy-frequency-time patterns in combination, and compares these to standard patterns established for spoken words. A relatively recent but extremely powerful technique departs from these prior art techniques, by detecting the occurrence of certain characteristics which uniquely identify segments of the words. The time base which is used in breaking down a spoken word is established by the occurrence of "machine syllables," these being formed by the identification of characteristic properties in the words themselves. In systems which utilize this technique, a separate machine syllable is defined for each successive transition to a voiced sound. The machine syllable is independent of the speech syllable, phonemes and other phonetic symbols which are conventionally used in speech work. The various voiced and unvoiced sounds may be further categorized as to specific properties with extremely high reliability according to this improved technique, and a new logic form is established by which any selected word out of an extensive vocabulary can be automatically identified with a high degree of certainty.

Whether speech recognition is to be accomplished by techniques using the frequency domain, the time domain or the machine syllable approach, the ability to recognize voiced sounds is extremely important. The same ability is of utility in other systems, such as those in which the sound of a human voice is used for automatic control.

Various voiced sound detectors have heretofore been used. These include systems which respond to the fundamental frequencies, or the harmonics (called formant waves) contained in the voiced sounds. Among the devices employed are circuits for detecting the existence of coincident related frequencies, circuits for detecting the existence of coincident related frequencies, circuits for detecting the difference between selected high and low frequencies and circuits for measuring the difference between selected related frequencies in electrical signal representations of speech. A different technique utilizes power peaks occurring at the voiced sound fundamental frequency to generate a series of pulse spikes which are then used to identify the fundamental frequency.

The previously available voiced sound detectors do not, however, operate with a sufficiently high certainty for useful speech recognition work. These detectors are particularly not accurate enough for use in machine syllable recognition systems, in which accurate and precise separation of voiced from unvoiced sounds becomes of extreme importance. It should also be noted that any speech recognition system should be able to distinguish human speech from extraneous noises, such as the ambient noises which are present under any normal working conditions, and the unexpected and accidental mechanical noises which may always occur. The systems heretofore available for voiced sound identification have also usually been extremely complex. In addition to the normalization equipment previously mentioned, they have often had to employ banks of filters or tuned circuits, together with time sampling circuits and logical decision circuits. It would be far preferable, of course, for a practical speech recognition system to have far fewer and far less complex circuits for performing the vital voiced sound detection function.

Discerning the difference between voiced and unvoiced sounds is only an initial, even though vital, step in speech recognition. The different types of voiced sounds must themselves be distinguished. In subdividing the voiced sounds in systems which utilize the machine syllable technique, a number of "machine vowels" are categorized separately. Accurate identification of particular voiced sounds is thus an integral part of voiced sound detector circuits and systems. Voiced sound detector circuits which have fine resolution capabilities therefore have extremely high versatility and application in speech recognition systems.

There are many instances in which the ability to recognize the existence of human speech, irrespective of its content, becomes important. Voice-switching techniques are particularly useful in communications, including telephone, radio-telephone, and all forms of radio transmission. Conventional telephony may be taken as an example. A disabled person, or one whose hands are occupied, may be seated adjacent a microphone coupled to a telephone equipped with a loudspeaker. If the microphone is voice-switched into the telephone, the person may answer a call simply by speaking. Ambient or mechanical sounds should not erroneously operate the switch, so that control by voiced sounds (which are present in virtually every spoken word) is highly advantageous. Voice-switching of other kinds is similarly of great utility, as where noise in a transmission link is to be blanked out except when someone is speaking.

It is therefore an object of the present invention to provide improved voiced sound detector circuits.

Another object of the present invention is to provide voiced sound detector circuits of extreme simplicity which nevertheless detect the occurrence of voiced human speech with a high reliability.

A further object of the present invention is to provide simple, economical but highly accurate circuits for distinguishing electrical signal representations of voiced human speech from electrical signal representations of unvoiced human speech and mechanically generated sounds.

Another object of the invention is to provide improved circuits for effecting automatic control in response to voiced sounds.

A further object of the invention is to provide improved means for distinguishing different types of voiced sounds from each other.

Circuits in accordance with the present invention sensitively distinguish voiced from unvoiced sounds by detecting the occurrence of an asymmetry characteristic in electrical signal representations of human speech. The asymmetry characteristic is present only in voiced sounds, but is present in each case therein, and results in an amplitude difference between positive-going peaks and negative-going peaks in the complex multifrequency voiced sound wave. According to the present invention, the complex wave is split into positive-going and negative-going cyclic components, and a difference is taken between them which represents and identifies the asymmetry characteristic.

In a specific example of a circuit in accordance with the present invention, electrical signal representations of human speech are applied to a pair of parallel-coupled oppositely poled diodes. One of the diodes passes the positive-going signal components in the complex multifrequency wave, and the other diode passes the negative-going signal components. Each of these component waves is then applied to a peak charging circuit, which has a time constant which corresponds to a typical syllabic speech interval. The signal levels maintained by the two peak charging circuits are subtractively recombined, so that the difference between the peak signals appears at a circuit junction, as a measure of the asymmetry characteristic. Signals in excess of a selected absolute amplitude reliably identify the presence of voiced sounds.

In other circuits in accordance with the invention, the phase relation of the input signal wave which is provided to a voiced sound detector circuit is controllably varied. The changes in phase relation cause the output signal to vary uniquely and identifiably with time for particular types of voiced sounds. These variations are caused to operate associated selection circuits. At the same time as the voiced sounds are detected, therefore, particular types of voice sounds may be identified so as to facilitate speech recognition.

In voice-switched systems according to other features of the invention, high frequency and asymmetry characteristics in speech are detected and used for automatic control purposes, such as to switch on a microphone and switch off a speaker. At the same time, the arrangement modifies the characteristics of the speech (as represented by electrical signals) so that there is no system feedback. With this arrangement, a great many voice-switched stations may be used together without causing the switching functions to become erroneously intermixed.

The foregoing and other objects, features and advantages of the invention will be apparent from the following more particular description of preferred embodiments of the invention, as illustrated in the accompanying drawings.

Figure 1:
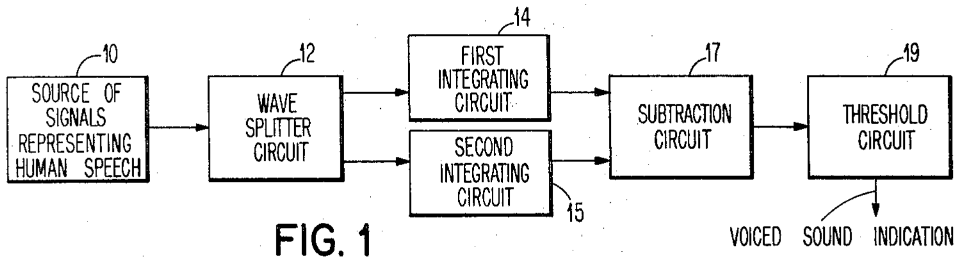
FIG. 1 is a block diagram of a voiced sound detector circuit in accordance with the present invention.

The principal elements of a voiced sound detector circuit in accordance with the present invention are shown in FIG. 1. A source of signals 10 provides complex electrical signal waves and signal variations which represent human speech. The source of signals 10 will, in the usual case, be or be similar to, a microphone and amplifier combination, although the signals may be played back with high fidelity from a magnetic tape system or other form of recording-reproducing system. In any event, the amplitude and frequency variations with time of the audio waves are precisely represented by the electrical signals. Signals from the source 10 are applied to a wave splitter circuit 12, which may be what is often referred to as a polarity sensitive or phase splitter circuit. The terms "wave splitter" and "phase splitter" are used herein in the following way. A complex electrical signal wave may consist of a great many alternating current (AC) components which vary equally and sinusoidally about a DC reference axis. True monofrequency components which make up a complex multifrequency wave have a reference axis which is substantially at ground or zero potential. Then, each of the monofrequency components in the complex multifrequency wave may be said to have a positive-going cyclic component and a negative-going cyclic component, the term "component" thus referring to the entire part of a wave which falls on one selected side of the reference axis. Accordingly, for monofrequency components the positive half cycles are referred to as the positive-going half cycles. The wave splitter circuit 12 acts to divide the apparent complex multifrequency wave which exists briefly as a spoken sound representation into its positive-going and negative-going cyclic components. These components exist concurrently from the standpoint of a typical syllabic speech interval.

The two concurrent signal components from the wave splitter circuit 12 are applied separately to first and second integrating circuits 14 and 15 respectively. The term "integrating circuit" is intended to have a broad connotation and includes peak charging circuits and time averaging circuits of various kinds which function to provide an indication of the amplitude of the applied signal component during a selected time interval. An indication of the relative amplitude of the two components is made by a subtraction circuit 17 which is coupled to both the first and second integrating circuits 14 and 15. The subtraction circuit provides a signal whose amplitude and sense indicate the difference between the signals from the integrating circuits 14 and 15. The output signal from the subtraction circuit 17 is coupled through a threshold circuit 19 which indicates the presence of voiced sounds in signals from the source 10. The threshold circuit 19 need not be used, but is employed to attain higher accuracy by distinguishing useful indications over random noise variations in the output signal.

Figure 2:
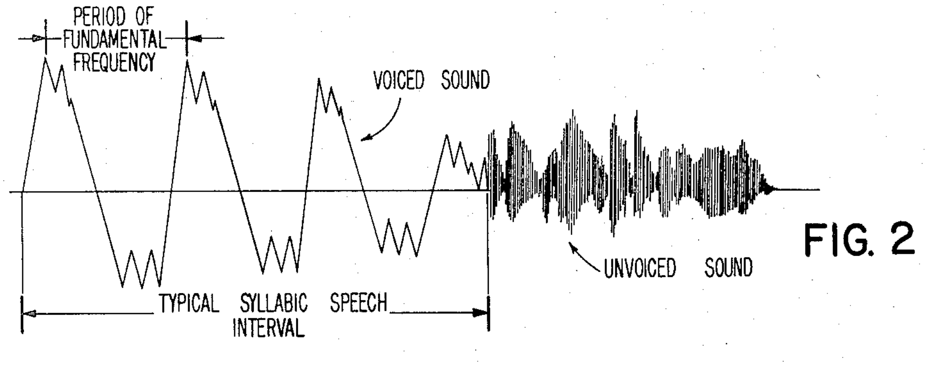
FIG. 2 is a diagram of an example of the complex waveform of voiced speech sounds useful in explaining the operation of systems in accordance with the invention.

The manner in which the arrangements of FIG. 1 operates to detect the presence of voiced sounds in human speech may be better understood by reference to the waveform of FIG. 2. This waveform represents, in idealized and non-scalar form, an example of how the complex multifrequency waves contained in voiced sounds have certain unique characteristics which enable ready identification of these sounds by the system of FIG. 1. Voiced sounds originate with puffs of air which are caused to vibrate the vocal chords. The typical syllabic speech interval, during which the identifying modulations of human speech are imposed on the vibrations, is of the order of 200 ms. (milliseconds). The interval may be limited by the mechanical action of the speech organs to a shorter interval, but is usually not much less than 100 ms. Over the syllabic speech interval, the sound usually has the characteristic of initiating with a relatively strong burst which terminates quite abruptly, usually more sharply than in the example shown. Thus voiced sounds have the characteristic of a damped oscillation. Within the syllabic speech interval, however, they may be considered to be quasi-periodic, because even though they are pulsed and damped they have the essential characteristics of a complex multifrequency wave during most of the interval. The voiced sounds have a fundamental frequency, as well as the harmonic "formant" waves which were previously discussed. These voiced sound characteristics exist in voiced frictional sounds (the "z" sound) and in muted sounds ("m" and "n" sounds) as well as in pure vowel utterances.

By contrast, the amplitude variations with time of unvoiced speech have the characteristics shown at the right hand end of FIG. 2. These constrictively formed sounds are essentially noiselike in character and have no definable frequency characteristics. A very significant factor which is involved here is the asymmetry which exists between the positive-going components of the voised speech waves and the negative-going cyclic components of the waves. It should be recognized that the asymmetry of the voiced portion of speech, is an invariant characteristic, although it may vary as to amount. This result is apparently due to the nature of the voice box and the resonant chambers which are used to effect frequency and amplitude modulation of the speech waves.

When signals from the source 10 of FIG. 1 are passed through the wave splitter circuit 12, therefore, the positive-going cyclic components of the comlex multifrequency wave are applied to one of the integrating circuits 14 and 15, while the negative-going cyclic components are applied to the other of the integrating circuits 14 or 15. Assume that, in correspondence to the example of FIG. 2, the positive-going components are of greater absolute amplitude than the negative-going components, and that the positive-going components are applied on the conductor coupled to the first integrating circuit 14. The level of the signal provided from the first integrating circuit 14 consequently is of greater absolute amplitude than the signal appearing on the output terminal of the second integrating circuit 15. Further, in this example, the signals are of opposite polarity sense. When these signals are subsequently additively combined their difference is obtained from the subtraction circuit 17. The difference between the two signals is appreciable, and in excess of the level selected to activate the threshold circuit 19, so that a voiced sound indication is provided from the threshold circuit 19.

The signals which are subtracted represent the difference between the positive-going and negative-going peaks, and regardless of the method of subtraction, a true indication of the presence of voiced sounds is obtained because of the asymmetry characteristic of the power peaks. Contrast this to the different output signal which is obtained when electrical signal variations representative of unvoiced speech are provided from the source of signals 10. In the latter instance, the noise spikes in the positive-going direction are substantially equal to the noise spikes in the negative-going direction, over a typical syllabic speech interval. Consequently, no significant and meaningful amplitude swing appears in the signals at the output terminal of the subtraction circuit 17 and no voiced sound indication is derived from the threshold circuit 19.

Figures 3, 4:
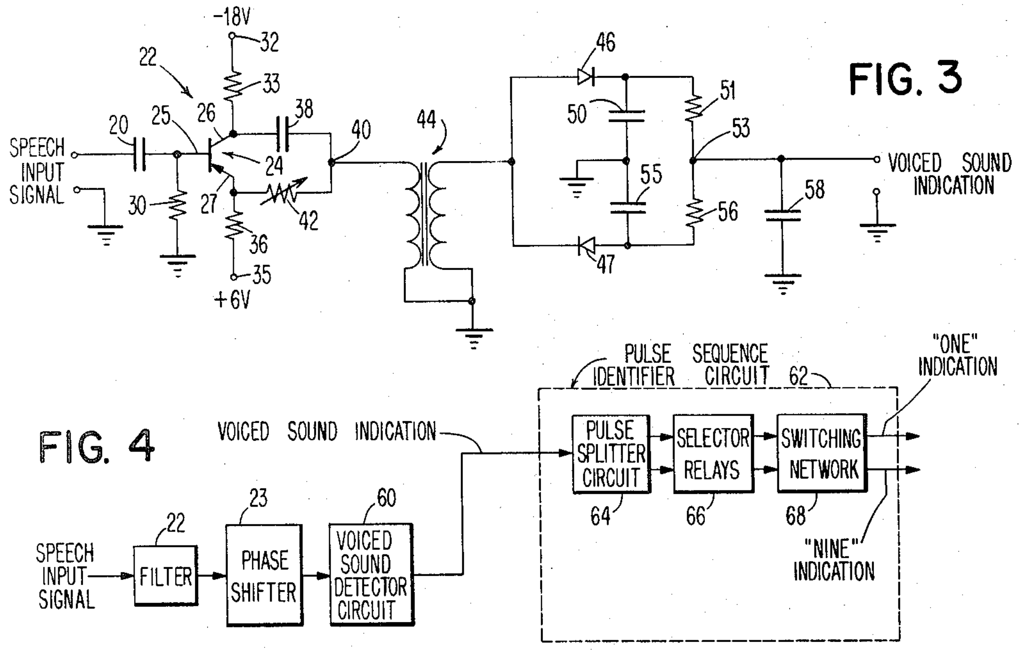
FIG. 3 is a schematic diagram of one voiced sound detector circuit in accordance with the invention.
FIG. 4 is a block diagram representation of a system for distinguishing a spoken "two" from a spoken "seven"

A particularly simple and effective voiced sound detector circuit is shown in FIG. 3, this general form of circuit being preferred because of its ability to distinguish between different voiced sounds with only a simple adjustment of a single element. In the circuit of FIG. 3, electrical input signals representative of human speech are provided from a source (not shown) through a DC blocking capacitor 20 to a phase shifter 22. Here the phase shifter 22 includes a transistor 24, shown as of P–N–P conductivity type by way of example, which has its base 25 coupled to ground through a resistor 30, its collector 26 coupled to a −18 volt supply 32 by a resistor 33 and its emitter 27 coupled to a +6 volt supply 35 through a different resistor 36. A selected phase delay may be introduced into the monofrequency components of the amplified signals from the transistor 24 by a passive circuit coupling its collector 26 and emitter 27. The passive circuit includes a capacitor 38 which couples the collector 26 to a circuit junction point 40, and a parallel adjustable resistor 42 which couples the emitter 27 to the same circuit junction point 40. This phase shifter 22 passes all frequencies of interest, but the amount of phase shift introduced for any monofrequency component is dependent both upon the setting of the adjustable resistor 42 and the frequency itself. Accordingly, for different phase shifts, the characteristic asymmetry pattern arising during a syllabic speech interval may vary, for certain adjustments, to favor positive-going cyclic components alone, negative-going cyclic components alone, or different sequences of these components, for given voiced sounds.

Signals derived at the circuit junction 40 from the passive network are applied through a current transformer 44 to a pair of parallel, oppositely poled semiconductor diodes 46, 47 which perform the wave splitting function. A first of the diodes 46 is poled to pass the positive-going cyclic components, while the second diode 47 is poled to pass negative-going cyclic components. With the reference axis of the waves being substantially at ground potential, this circuit provides accurate but separate representations of the positive and negative cyclic components of the complex multifrequency wave. A peak charging circuit coupled to the first diode 46 consists of a shunt capacitor 50 coupled to ground and a series resistor 51 coupled to a second circuit junction point 53. The peak charging circuit coupled to the second diode 47 also consists of a shunt capacitor 55 coupled to ground and a series resistor 56, the series resistor being coupled between the anode of the second diode 47 and the second circuit junction point 53. The diodes 46 and 47 have matched characteristics, as do the two peak charging circuits, so that like amplitude variations result at the second circuit junction point 53, for like absolute amplitude variations derived from the phase shifter 22.

The discharge time constants of the peak charging circuits are alike, and selected to be approximately 200 ms., corresponding to the typical syllabic speech interval. Signal variations occurring at the second circuit junction point 53 appear as relatively slow varying output signals at the output terminals of the circuit after a smoothing capacitor 58 evens out the signal fluctuations.

With this arrangement, the phase delay may be set anywhere in a range of values, so as to selectively alter the asymmetry characteristic of given voiced speech waves. Assuming, however, that no phase delay is employed and that a typical voiced speech wave as shown in FIG. 2 appears at the input terminal, the positive going cyclic component will be passed by the first diode 46 and the negative-going component will be passed by the second diode 47. The peak charging circuit elements 50, 51 which store the positive-going components provide a signal which tends to shift the level of the second circuit junction point 53 an amount in the positive direction which corresponds to the highest amplitude of the positive-going cyclic components occurring during a syllabic speech interval. Similarly, the other peak charging circuit elements 55, 56 provide a signal which tends to shift the level of the potential at the second circuit junction point 53 in the opposite direction (negative) by an amount determined by the absolute amplitude of the negative-going component. The two signal levels are therefore subtracted at the second circuit junction point 53, and the signal appearing at the output terminals is a relatively slowly varying component which represents the asymmetry characteristic for no phase delay. Without phase delay, this asymmetry characteristic will usually consist of a rounded positive pulse or a rounded negative pulse having a duration substantially that of the syllabic speech interval.

Figure 5:
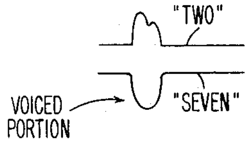
FIG. 5 is a representation of waveforms useful in explaining the operation of the arrangement of FIG. 4.

The use of voiced sound detector circuits in accordance with the invention are not only significant because of the reliability of the circuits, but also because of the fact that such circuits permit other arrangements in accordance with the invention for distinguishing one voiced sound from another, as may be better understood by reference to FIGS. 4 and 5. The spoken "one" and spoken "nine," for example, each represent a single "machine syllable." The "n" sounds which are present in these words do not have sufficient frictional characteristics for them properly to be identified as muted sounds. They thus appear as voiced sounds alone, and because they contain only a single transition to voiced characteristics without significant frictional sounds, are extremely difficult to detect and distinguish by systems heretofore available.

Figure 7:
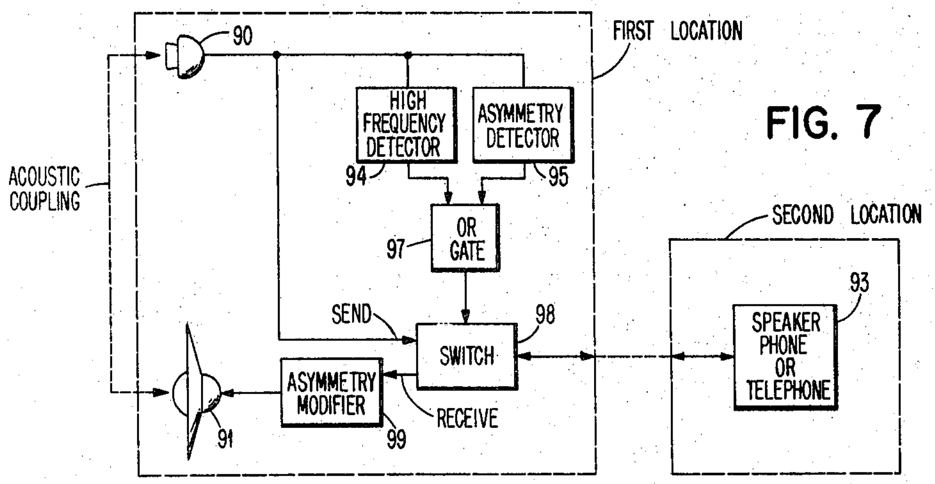
FIG. 7 is a schematic diagram of a voice-switching system in accordance with the invention.

For accurate and reliable discrimination of different voiced sounds, the input signals representative of human speech may be applied in series with a phase shifter 22 and a filter 23. The voiced sound indications from the detector circuit 60 are coupled to a pulse sequence identifier circuit 62 which consists principally of an arrangement of gating circuits which respond to characteristic pulse patterns. The phase shifter 22 may correspond to the type of circuit previously described with reference to FIG. 3, as may the voiced sound detector circuit 60. The phase shift or phase delay introduced by the phase shifter circuit 22 is empirically adjusted to provide a different and substantially invariant output signal characteristic from the voiced sound detector circuit 60 for each of the two spoken sounds which are to be separated from each other. The filter 23 may be a high pass, low pass or band pass device whose acceptance band is empirically selected. With proper selection of filter 23 and adjustment of the phase shifter 22, for example, the typical waveforms shown in FIG. 5 for the two spoken words "two" and "seven" are obtained, despite the normal range of variations in the characteristics of the speaking voice, and in frequency, amplitude and speech rate. The criterion at this point is the average polarity of the wave shape, i.e., whether, as a whole, it is positive or negative. In my copending U.S. Patent application 52,548, filed Aug. 29, 1960, FIG. 7 shows a wave shape for a "one" and "nine" separation where the sequence of polarity determination is the desired criterion. Other circuit variations have shown that filter 23 and phase shifter 22 can be used singly or in combination, depending on the sound to be separated. Thus, the phase shift inherent in the filter can be utilized to separate a "three" and a "four" by using the average polarity of the waveform as a criterion.

The pulse sequence identifier circuit 62 which is coupled to the voiced sound detector circuit 60 accurately distinguishes, for example, the "one" signal pattern from that for the "nine." It includes a pulse splitter circuit 64, which may consist of parallel-coupled opposite conductivity-type transistors, or oppositely poled rectifier elements or like arrangements for separating positive from negative pulses. The separated signals from the pulse splitter circuit 64 are applied to a group of selector relays 66, which in turn control a switching network 68. By appropriately interconnecting controlled relays within the switching network 68, in accordance with well known techniques, the time sequences in which the positive and negative pulses are received may be identified. Thus a negative pulse received alone at the selector relays 66 is caused to control the switching network 68 so that a "nine" indication results, while a positive pulse followed by a negative pulse gives the correct "one" indication.

For other determinable amounts of phase shift, the same phase shifter circuit 22 may be used to distinguish other voiced sounds. The "three" and "four" sounds may be used to generate positive and negative pulses respectively, which may in turn be separated from each other by the selector relays 66 and the switching network 68.

The filter 23 may be alternatively used in series to cause different voiced sounds to generate identifiable voiced sound indications. Here, the rejection of certain frequency components is found to materially but predictably alter the asymmetry characteristics of the specific voiced sounds, thus enabling their individual recognition. In practice, a number of separate circuits, using phase shifts with or without filtering, together with voice sound detectors may be used with a sufficiently large set of selector relays and switching elements or other techniques, such as optical best matching, to enable recognition of a large vocabulary.

The pulse sequence identifier circuit 62 is merely one example of what might be used. Like results might also be accomplished by a logical gating network arranged to generate pulse sequences and to distinguish the different possible conditions.

Figure 6:
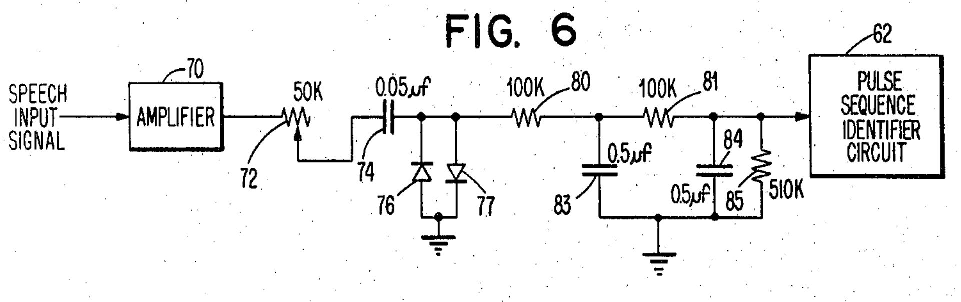
FIG. 6 is a schematic diagram of a second voiced sound detector circuit in accordance with the invention.

A different form of voiced sound detector in accordance with the invention is shown in FIG. 6. Asymmetry between positive and negative cyclic components is reliably determined by a particularly simple and inexpensive passive circuit.

In FIG. 6, speech input signals are coupled through an amplifier 70 to a variable filter phase shift circuit including a variable resistor 72 coupled in series with a comparatively small clamped capacitor 74. A pair of oppositely-poled clamping diodes 76, 77 couple the capacitor 74 to ground. A low pass filter circuit consisting of a pair of series-connected resistor 80, 81 and shunt capacitors 83, 84 and a shunt resistor 85 connects these elements to a pulse sequence identifier circuit 62.

In operation, the arrangement of FIG. 6 provides recognition of voiced from unvoiced sounds, and recognition of particular types of voiced sounds, corresponding to the arrangements of FIGS. 3 and 4. The asymmetry of voiced sound signals derived from the amplifier 70 may be changed by adjustment of the variable resistor 72 to establish desired patterns. The asymmetry still exists, however, and the complex multifrequency wave generates a useful voiced sound indication because the charge level on the clamped capacitor 72 is, in effect, subject to drift. The power peaks of the wave, being asymmetrically arranged about the true axis of the wave, cause the average value, or reference axis, to shift in the direction of asymmetry. It is this shift which appears as a long-term change in the charge level of the clamped capacitor 74. High frequency components are removed by the coupled capacitors 83, 84, and the remaining low frequency components, representative of asymmetry variations, are applied to the identifier circuit 62. The asymmetry variations again are like those shown in FIG. 5. Frictional sounds and mechanically generated sounds do not result in a similar drift, and thus highly accurate detection is made possible.

A voice-switched system using the reliable and accurate techniques provided in accordance with the invention is shown in FIG. 7. A typical speaker phone installation for communication between two or many different locations is illustrated. In order for the system to operate without manual handling, it is necessary to eliminate feedback because of the acoustic coupling between the microphone 90 and loudspeaker 91 at any location, and to respond automatically to voice communications. Systems such as those in FIG. 7 fully satisfy these requirements.

The acoustic coupling which exists between the microphone 90 and the loudspeaker 91 involves some inherent frequency limitations and speech characteristics. With the ordinary telephone communication system, for example frequencies involved are from 300 to 3500 cycles per second. Thus signals provided from a speaker phone or telephone 93 at a second location to the loudspeaker 91 at the first location will be known not to be in excess of 3500 cycles. Signals which are derived at the microphone 90, however, contain higher frequencies, as 4000 cycles and above. In addition, these signals, representing the speech of a human operator, also include the asymmetry characteristic which is invariantly present in voiced sounds, and therefore virtually constantly present in speech. The concurrent existence of the high frequencies and the asymmetry characteristic therefore distinguished signals from the microphone 90 which are initiated by a person at the first location, as opposed to a person at a different location causing operation of the loudspeaker 91 through the telephone system. This condition is effectively identified by a high frequency detector 94 and an asymmetry detector 95 which are coupled to the microphone 90. The high frequency detector may be a high pass filter having its lower band limit in excess of 3500 c.p.s. The asymmetry detector 95 may be a voiced sound detector as above described in conjunction with FIGS. 1–6. Signal indications provided from each of the high frequency detector 94 and the asymmetry detector 95 may be provided through an OR gate 97 to actuate a switch 98, causing the signals provided in the "send" mode of operation to be directed to the speaker phone or telephone 93 at the second location, or to other distant systems.

Complete automatic operation, and protection from feedback, is obtained by the use of an asymmetry modifier 99 in the coupling between the switch 98 and the loud speaker 91. Incoming signals from the distant speaker phone or telephone 93 are, as indicated above, not substantially of 3500 c.p.s. at their upper limit. They do, however, contain the asymmetry characteristic of voiced human speech. The asymmetry characteristic may be removed by clipping, or by the introduction of a selected phase shift. Accordingly, the asymmetry modifier 99 is a clipper or phase shifter intended for this purpose. It is significant to note, that just as intelligibility is not destroyed by the frequency limitation of the telephone system, the sounds emanating from the loudspeaker 91 still remain distinguishable by a person even after being subjected to phase shift or clipping.

Sounds emanating from the loudspeaker 91 do not contain the "live" voice asymmetry characteristic due to the modifying action of diode 110 or a phase shifting network similar to those described in FIGS. 1–6. "Live" voice is defined as the talker's voice as opposed to the reconstructed speech signal from speaker 108. The presence of either the asymmetry characteristic or the high frequency in the signals from the microphone 90 will be sufficient to establish that the system at the first location is operating in the "send" mode. This is the reason for the OR gate 97 coupled to the detectors 94, 95. Whenever the appropriate characteristic are caused to actuate either one of the detectors 94, 95, the switch 98 is therefore operated to shut off the loudspeaker 91 and to send the signals to the second location. In the absence of signals from the detectors 94, 95 the switch 98 returns to a normal state, in which the microphone 90 is coupled out of the link to the second location, and in which only the loudspeaker 91 has control.

The system is particularly useful in high ambient noise conditions, because it eliminates the additional noise effect of the acoustic coupling. Furthermore, the automatic voice switching gives complete freedom to the operators at each of the locations.

Figure 8:
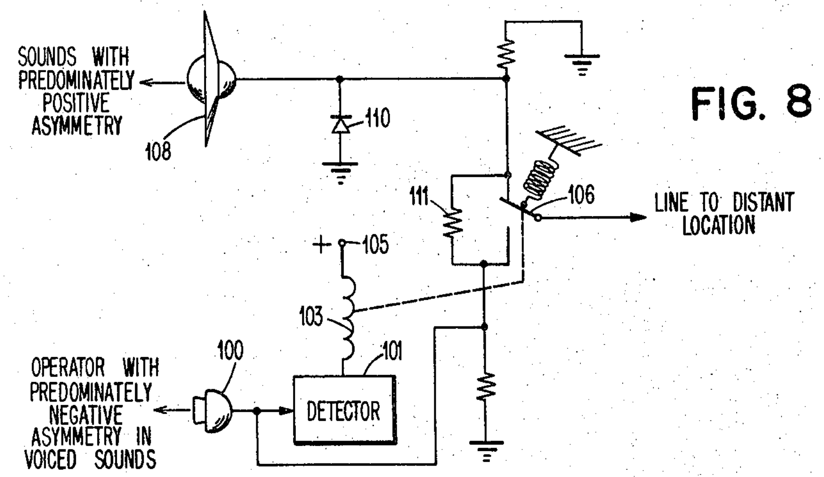
FIG. 8 is a schematic diagram of a different form of voice-switching system.

A different form of voice-switched system, for operating without significant feedback but also operating without an on-off switching action of the type which might introduce disturbing noise effects, is shown in FIG. 8. This system utilizes the fact that any individual has a predominate asymmetry characteristic, positive or negative, in the voiced sounds which he or she utters. Here, as an illustration it is assumed that the electrical signal from the microphone 100 has a predominately negative asymmetry characteristic. Signals from the microphone 100 are applied to detector 101, a combination of high frequency detector 94, asymmetry detector 95 and "or" gate 97, coupled to a relay coil 103. The relay coil 103 is coupled to a positive voltage source 105 such that the coil 103 is energized only for the "live" voice indication signals from microphone 100.

The relay coil 103 controls the position of a single pole double throw switch 106 which normally is held out of direct circuit connection with the microphone 100. Energization of the coil 103, however, makes a direct connection between the microphone 100 and a line to other locations of the communication system. When the switch 106 is in its alternate, normal position, the outgoing-incoming line is coupled directly to a loudspeaker 108 at the same location as the microphone 100. The loudspeaker 108 is acoustically coupled to the microphone 100, but no adverse effects are realized because of this fact. A clipping diode 110 coupled to the input circuit of the loudspeaker 108 is so polarized as to, in effect, remove a part of the energy in the negative cycle components without affecting the positive cyclic components. Thus voiced sounds from the loundspeaker 108 have predominately positive asymmetry. The asymmetry detector 101 and relay-coil 103 remain unaffected by such sounds, so that incoming transmissions are properly directed to the loudspeaker 108 until such time as the operator talks into the microphone 100.

There is an electrical coupling between the alternate contacts of the switch 106, but this voltage stabilizing coupling is made by a relatively large resistor 111. As a result, the switching action is relatively "soft," and introduces little audible disturbance. At the same time the signal picked up from the acoustical coupling by the microphone 100 is greatly attenuated before coupling to the loudspeaker 108, so that no deleterious feedback exists. The resistor 111 also isolates either the microphone 100 or the loudspeaker 108 from the incoming-outgoing line, depending upon the position of the switch 106.

While a number of different forms of voiced sound recognition circuits and systems have been described, along with various alternative expedients, it will be appreciated that still other modifications may be made. Accordingly, the invention should be considered to include all variations and derivations falling within the scope of the appended claims.

I claim:

1. A system for identifying the occurrence of voiced sounds in human speech, including means for forming a complex multifrequency signal wave representative of the speech, means responsive to the complex signal wave for dividing the wave into two concurrently existing cyclic components of opposite polarity sense, means for time averaging each of the components over a selected spoken syllabic interval, and means for subtracting one time average signal from the other to provide a voiced sound indication on occurrence of an asymmetry between the cyclic components of opposite polarity sense in the selected syllabic interval.

2. A system for detecting voiced human speech including, means for forming a complex electrical signal wave representative of the speech, means responsive to the electrical signal wave for splitting the wave into two component waves, one of which represents the positive cyclic variations in the complex wave, and the other of which represents the negative cyclic variations in the complex wave, means responsive to the two component waves for time-averaging each component wave over a time interval which corresponds to a selected spoken syllabic interval, means responsive to the time-average components for subtracting one time-averaged component wave from the other, and means responsive to the means for subtracting, for indicating the presence of voiced sounds in the speech on the occurrence of an asymmetry between the positive cyclic portions and the negative cyclic portions of the complex wave which is greater than a selected amount.

3. A circuit for detecting the occurrence of voiced sounds in human speech, including the combination of means for providing electrical signal representations of human speech, means responsive to the electrical signal representations for identifying the occurrence of asymmetrical relationships between opposite polarity components in the electrical signals, and means responsive to the identification of asymmetrical relationships in the signal representations for signalling the occurrence of voiced sounds in the speech.

4. A system for identifying the occurrence of voiced sounds in human speech including means for forming a complex multifrequency signal wave representative of the speech capacitative means coupled to receive the multifrequency signal wave, parallel unidirectional elements of opposite polarity sense coupled to the capacitive means for clamping signals at the capacitive means to a selected level, such that an asymmetry between opposite polarity cyclic components in the multifrequency signal wave results in a drift of the signal level of the capacitive means, and filter means coupled to the capacitive means for deriving relatively slow-varying components in the signal level thereof.

5. A voiced sound detector including first means for modifying the asymmetry characteristics of sound signals, second means coupled to the first means for providing a signal representative of the variations with time in the asymmetry characteristics over a syllabic speech interval, and means coupled to the second means for identifying predetermined time variations in the asymmetry characteristics.

6. A system for distinguishing between different voiced sounds occurring as electrical signal representations of human speech, including the combination of means response to the electrical signal representations for selectively modifying the monofrequency components of the electrical signal representations, means responsive to the selectively modified signals for providing a time averaged output signal whose amplitude and polarity indicate the degree and sense of the asymmetry between positive components and negative components in the electrical signal representations, and means responsive to the time averaged output signals and to the time varying characteristics of the signals for identifying the occurrence of selected voiced sounds by the occurrence of predetermined pulse sequences.

7. A voice sound detector circuit for distinguishing different types of voiced sounds from each other including the combination of means responsive to the voiced sounds for introducing a selected delay into monofrequency components of the voiced sounds, means responsive to the delayed components for indicating the degree of asymmetry between positive cyclic components and negative cyclic components, and means responsive to the degree of asymmetry for identifying selected voiced sounds by the occurrence of predetermined asymmetry characteristics.

8. A circuit for identifying selected voiced sounds in human speech, the sounds being provided as complex wave electrical signal representations having negative-going and positive-going variations, including the combination of phase shifter means responsive to the electrical signal representations for introducing a selected amount of phase delay into the monofrequency components which make up the complex wave, means coupled to the phase shifter means for separating the positive from the negative parts in the electrical signal representation, means responsive to the separated positive and negative parts for time averaging the electrical signal representations over a time interval which corresponds to a selected syllabic speech interval, means responsive to the time averaged signals for subtracting one of the time averaged signals from the other, and means responsive to the subtraction means for signalling the occurrence of a selected voiced sound characteristic due to the presence of a selected time varying asymmetry relationship between the positive and negative parts with the introduction of a selected phase delay.

9. A circuit for detecting the occurrence of voiced sounds in electrical signal representations of human speech, comprising a pair of parallel, oppositely poled unilateral conducting elements, each coupled to receive the electrical signal representations, a circuit junction coupling, a pair of similar peak signal charging circuits, each coupled between a different one of the oppositely poled diodes and the circuit junction coupling, each of the peak charging circuits providing a time averaging of the electrical signal representations over an interval of approximately 200 milliseconds and output circuit means coupled to the circuit junction coupling and including capacitor means for providing a smoothed signal representing the difference between the amplitudes of the peak signals provided to the peak charging circuits during the 200 millisecond interval.

10. A circuit for providing output signal variations to identify the occurrence of selected voiced sounds in human speech which is represented by complex electrical signal waves, comprising phase shifter means responsive to the complex electrical signal waves for introducing a selected phase delay in the monofrequency components of the electrical signal waves, a pair of oppositely poled semiconductor diodes coupled to the phase shifter means for splitting the complex electrical signal waves into their positive and negative cyclic components, means providing a circuit junction, first and second peak charging circuits including resistor-capacitor combinations, each of the peak charging circuits being coupled between a different one of the oppositely poled diodes and the circuit junction, and having a time constant such as to provide signal storage of the peak signal provided through the associated diode over an approximately 200 ms. interval, and means coupled to the circuit junction for identifying the occurrence of selected signal polarity and amplitude patterns at the circuit junction, thus to identify the selected voiced sounds.

11. A voiced sound detector circuit including the combination of a phase shift circuit coupled to receive complex multifrequency electric signal waves representative of speech, the phase shift circuit including a series-connected variable resistor and a relatively small capacitor, clamping means including a pair of parallel oppositely-poled diodes coupling the capacitor to a reference, filter means coupled to the capacitor and the clamping means, and passing relatively slow-varying components of the signal from the capacitor, and pulse sequence identifier means coupled to the filter means.

12. Apparatus for sound analysis which comprises means for translating sounds into corresponding electrical signals having an envelope, circuit means operated by said signals for providing first and second signals which vary in amplitude in accordance with the envelope of said electrical signals which, respectively, are of one polarity and of the opposite polarity, means for subtracting said first and second signals to provide a third signal indicative of the bilateral unbalance of said first and second signals, and means operated by said third signal for deriving information as to the characteristics of said sound.

13. Apparatus for analyzing sounds which comprises:

means for translating said sounds into bilateral electrical signals having envelopes of opposite polarities which correspond respectively to the compression and rarefaction portions of the waves of said sounds, circuit means for detecting bilateral asymmetry in said envelopes and providing a further signal in response thereto, and means operated by said further signal for deriving information as to the characteristics of said sound, said last-named means including means responsive to the waveform of said further signal for recognizing certain sounds.

References Cited

UNITED STATES PATENTS

| | | | |
|---|---|---|---|
| 2,480,128 | 8/1949 | Frum | 324—78 |
| 2,114,680 | 4/1938 | Goldsmith | 179—1.3 |
| 2,646,502 | 7/1953 | Bell | 333—19 X |
| 2,774,940 | 12/1956 | Bernet | 333—19 X |
| 2,819,442 | 7/1958 | Goodrich | 307—88.5 |
| 3,047,813 | 7/1962 | Danker | 329—129 |

OTHER REFERENCES

"A Frame-Grid Audio Pentode for Stereo Output," by McKain et al., IRE Transactions on Audio, July-August 1959; pages 101–106.

KATHLEEN H. CLAFFY, *Primary Examiner.*

L. M. ANDRUS, ROBERT H. ROSE, *Examiners.*

H. W. GARNER, A. J. SANTORELLI, R. MURRAY, R. P. TAYLOR, *Assistant Examiners.*